United States Patent [19]

Didato

[11] 4,009,900
[45] Mar. 1, 1977

[54] VERTICAL SNUBBER SHIPPING DEVICE
[76] Inventor: Thomas P. Didato, 32 Washington Ave., Middlesex, N.J. 08846
[22] Filed: Feb. 19, 1976
[21] Appl. No.: 659,406
[52] U.S. Cl. .......................... 296/1 A; 105/368 R; 114/219; 267/136
[51] Int. Cl.² ................. B61D 3/16; B61D 43/00; B62D 39/00; F16C 15/00
[58] Field of Search .................. 105/366 R, 368 R; 114/219, 220; 206/521; 248/358 R, 358 A; 267/136, 139; 280/179 R, 447; 296/1 A

[56] References Cited
UNITED STATES PATENTS

| | | | |
|---|---|---|---|
| 929,139 | 7/1909 | Kirchner | 114/70 |
| 1,295,626 | 2/1919 | Snell | 114/219 X |
| 1,859,076 | 5/1932 | Dietrich | 105/366 R |
| 1,923,382 | 8/1933 | Leet | 105/368 R X |
| 2,065,573 | 12/1936 | Frede | 105/368 R X |
| 2,842,939 | 7/1958 | D'Auriac | 114/219 X |
| 3,118,688 | 1/1964 | Stilley | 280/447 |
| 3,371,899 | 3/1968 | Johnson | 267/136 X |

Primary Examiner—Robert J. Spar
Assistant Examiner—Howard Beltran
Attorney, Agent, or Firm—Baldwin, Wight & Brown

[57] ABSTRACT

A snubber for interpositioning between a substantially vertical surface on a transporting vehicle and an end member of a transported vehicle carried by the transporting vehicle comprises two elements, viz,: a first element for being secured to said substantially vertical surface on the transporting vehicle, and a second element mounted on the first element for cushioned vertical movements relative thereto, the second element having a substantially vertical surface engageable by the end member of a transported vehicle. Relative vertical movements between the transporting vehicle and the transported vehicle are accompanied by vertical movement of the transported vehicle end member substantially in unison with said second element, thus preventing undue rubbing of the end member on the snubber.

24 Claims, 5 Drawing Figures

VERTICAL SNUBBER SHIPPING DEVICE

This invention relates to new and useful improvements in snubbers for interpositioning between transporting vehicles and transported vehicles carried thereby.

BACKGROUND OF THE INVENTION

Automobiles have been transported on trucks with the front bumpers of the automobiles bearing against vertical surfaces on the trucks. During travel, vertical road shocks imposed on the trucks have caused relative vertical movements between the trucks and automobiles carried thereby. This has caused the automobile bumpers, especially those having rubber parts, to be damaged by rubbing against the truck vertical surfaces.

SUMMARY OF THE INVENTION

The present invention provides for prevention of harmful rubbing of an end member, such as a bumper, of a transported vehicle carried by a transporting vehicle against a surface on the transporting vehicle engaged by the end member when there is relative vertical movement between the two vehicles.

A broad object of the invention is to provide a snubber for interpositioning between a relatively vertical surface of a transporting vehicle and an end member of a transported vehicle carried by the transporting vehicle, the snubber having means providing a vertical surface engageable by the end member and so mounted as to be movable vertically substantially in unison with the end member in response to relative vertical movements between the two vehicles.

Another object of the invention is to provide a snubber characterized as above and comprising two elements, the first of which is adapted to be secured to a transporting vehicle and the second of which is mounted on said first element for relative vertical movements, said second element providing a surface engageable by the end member, such as the front bumper, of a transported vehicle.

A further object of the invention is to provide a snubber of the character stated including means for cushioning the vertical movements of one of said members relative to the other of said members.

A further object of the invention is to provide rolling connection between the two elements.

Further objects of the invention will be apparent from a reading of the following detailed description of a preferred embodiment, the appended drawings, and the claims.

DETAILED DESCRIPTION

Figure 1:
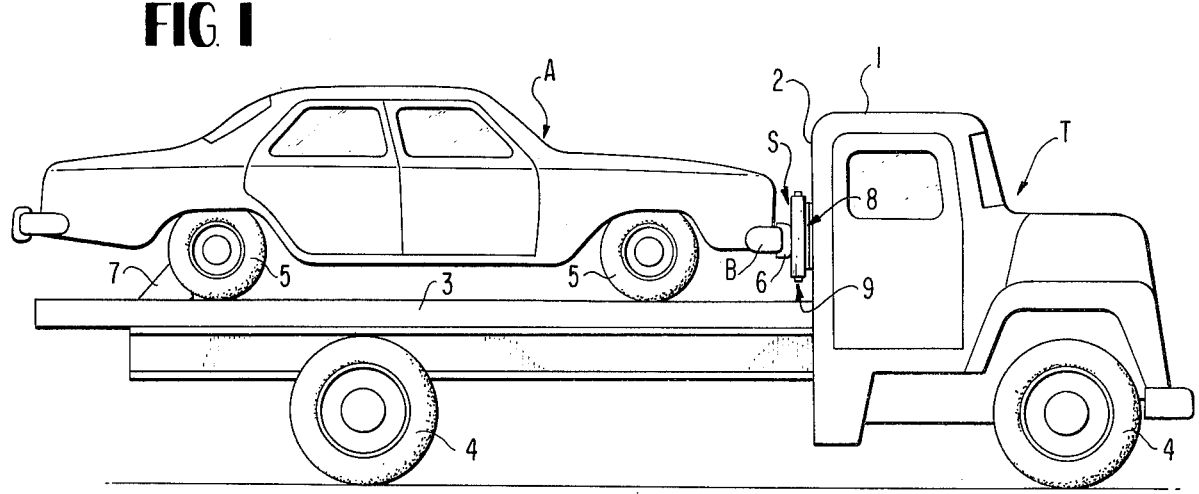
FIG. 1 is a somewhat schematic side elevational view of a transporting truck vehicle, an automobile vehicle supported thereon for being transported, and a snubber mounted on the truck vehicle and being engaged by the automobile front bumper.
Figure 2:
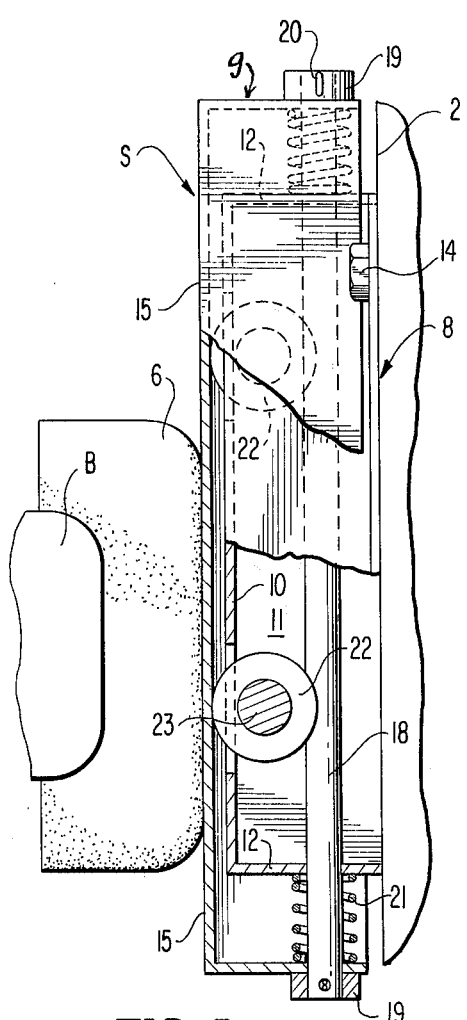
FIG. 2 is a side elevational view on the enlarged scale compared to FIG. 1 showing a portion of the rear vertical wall of the truck cab, a portion of the automobile front bumper, and the snubber which is shown partly in elevation and partly in vertical section.
Figure 3:
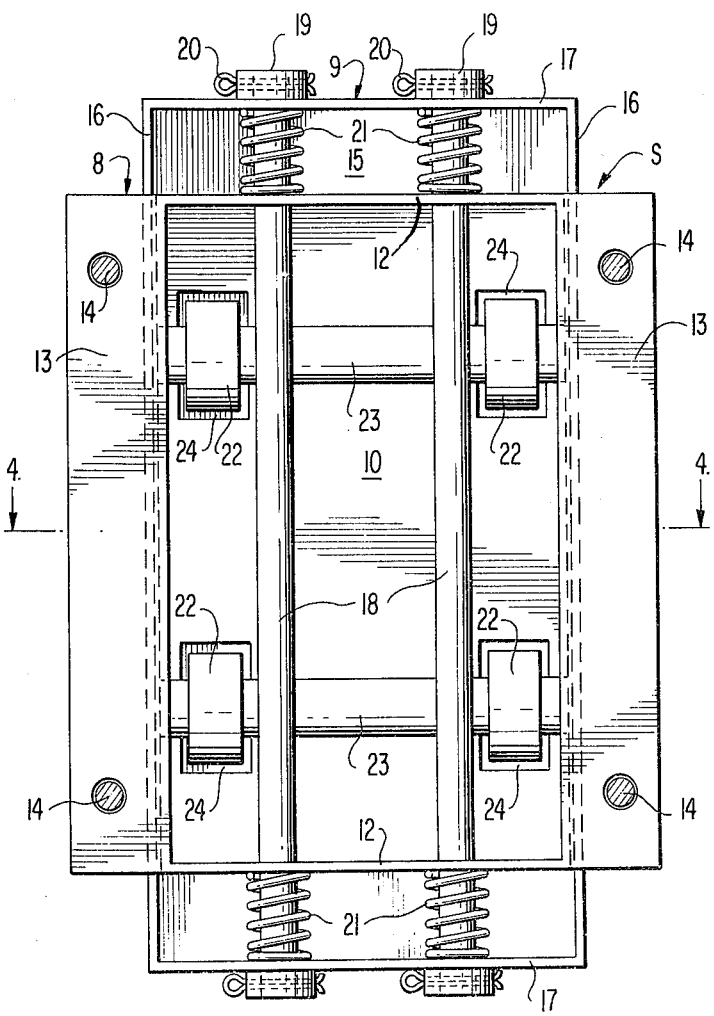
FIG. 3 is an elevational view showing the snubber construction as viewed from its front, that is from that face thereof which is secured in use to the rear vertical wall of the truck cab.
Figure 4:
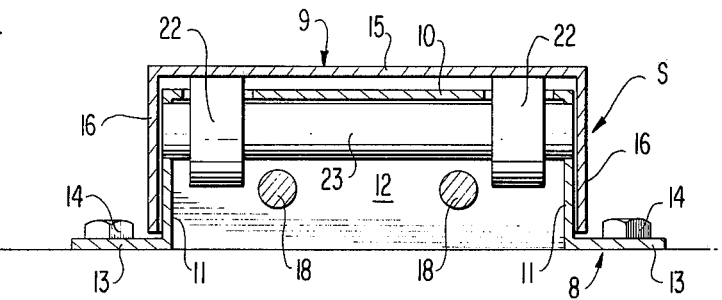
FIG. 4 is a horizontal section on the line 4—4 of FIG. 3.
Figure 5:
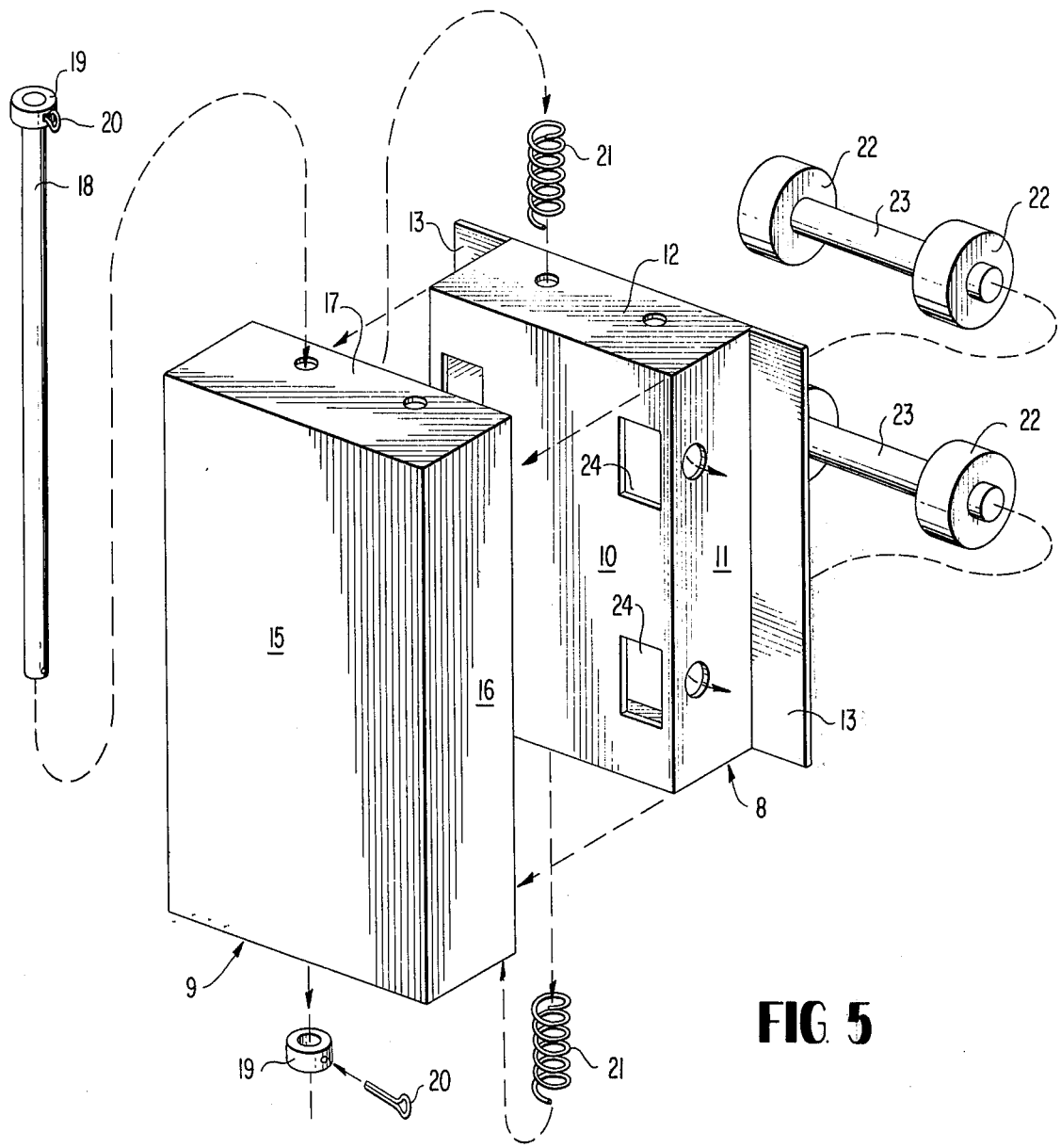
FIG. 5 is an exploded perspective view showing the parts of the snubber deployed, and indicating the mode of assembling.

An illustrative and the presently preferred embodiment of a snubber, generally designated S, according to the invention is shown by way of example as being used in connection with a transporting truck vehicle T and a transported automobile vehicle A carried by the truck vehicle T.

The truck T may be of conventional construction including a cab 1 having a relatively vertical rear surface 2 extending transversely to the line of travel, a bed 3 providing a relatively horizontal carrying surface and wheels 4 equipped with pneumatic tires.

The automobile A has wheels 5 equipped with the usual pneumatic tires resting upon the horizontal surface of the bed 3, and a front bumper end member B provided with rubber or other cushioning parts 6 as is well known.

For being transported, the automobile A is positioned on the truck bed 3 with the rubber bumper parts 6 engaging the snubber S as indicated in FIG. 1. Any suitable means may be provided for preventing rearward movement of the automobile A relative to the truck T so as to maintain the automobile positioned with its bumper parts 6 in engagement with the snubber S. In FIG. 1, chocks, one of which is shown at 7, are positioned on the truck bed 3 behind the automobile rear wheels.

Travel of the truck T necessarily subjects it to road shocks which are transmitted to the transported automobile A, causing relative up-and-down vertical movements between the truck and the automobile. If the automobile bumper parts 6 were to engage a fixed vertical surface at the back of the cab 2, the relative movements between the two vehicles would cause rubbing of the rubber bumper parts 6 on the fixed vertical surface with damage to the rubber parts. Undue rubbing of the rubber bumper parts 6 is prevented by the interpositioning of the snubber S between the rear vertical surface 2 of the truck cab 1 and the rubber bumper parts.

The snubber S basically includes a first element generally designated 8 attached to the vertical surface or back 2 of the cab, a second element generally designated 9 mounted on the first element 8 for relative vertical up-and-down movements and being engageable by the rubber bumper parts 6, and means cushioning the relative vertical movements between the elements 8 and 9. The construction is such that during transport relative vertical movements between the two vehicles will be accompanied by movement of the rubber bumper parts 6 substantially in unison with movement of the element 9 while in contact therewith, thus preventing undue rubbing of the bumper parts 6 on the element 9.

As shown more particularly in FIGS. 2–5, the element 8 comprises a panel 10 providing a vertical surface, side walls 11,11, upper and lower end walls 12,12 and flanges 13,13 extending outwardly from the side walls 11,11. Bolts 14 extending through the flanges 13,13 secure the element 8 to the back 2 of the cab 1.

The element 8 is of simple construction, being formed from a plate blank bent to provide the panel 10, side walls 11, the end walls 12 and flanges 13. The mating edges of the folded blank parts 10, 11 and 12 may be welded together.

Also as shown particularly in FIGS. 2–5, the second element 9 comprises a wall part 15 providing a vertical surface which is disposed vertically when in use, side walls 16,16 and upper and lower end walls 17,17. The element 9 may also be formed from a plate blank bent to provide the walls 15, 16 and 17. The mating edges of the folded parts 15, 16 and 17 may be welded together.

In assembly, the element 9 is placed over the element 8 so that the wall 15 of the element 9 is parallel to, adjacent to, and spaced from the panel 10 of the element 8, the side walls 16 of the element 9 are respectively parallel to and spaced from the side walls 11 of the element 8, and the end walls 17 of the element 9 overlap and are respectively spaced from the end walls 12 of the element 8.

The element 9 is mounted for vertical movements on the element 8 by vertical guide rods 18 which are attached to the end walls 17 of the element 9 by collars 19 held in place on opposite ends of the guide rods by cotter pins 20. The guide rods 18 extend through guideway apertures in the end walls 12 of the element 8.

Coil springs 21 surrounding the end portions of the guide rods 18 are interposed between the respective pairs of overlapping end walls 12 and 17 of the elements 8 and 9. The springs at the opposite ends of the guide rods 18 act upon the elements 8 and 9 in opposite directions and tend to maintain the element 9 in a position between its maximum up-and-down positions relative to the element 8. The springs 21 yield in response to road shocks transmitted to the vehicle A so as to permit cushioned vertical movements of the element 9 with respect to the element 8. This enhances the maintaining of the rubber bumper parts 6 in substantially fixed relation to the bumper element 9 so as to move substantially in unison therewith and to avoid rubbing of the bumper parts.

The invention provides for preventing transmission of horizontal force or loading between the guide rods 18 and the guideways in the walls 12 of the first element to such degree as would interfere with the free, although cushioned, relative vertical movements between the elements 8 and 9. For this purpose, four rollers 22 are journalled to rotate on horizonal axes, two each, on each of two shafts 23 which are mounted on and extend between the side walls 11,11 of the element 8. The shafts 23 are so positioned on the walls 11 that portions of the rollers 22 project respectively through openings 24 in the panel 10 of the element 8. As shown particularly in FIGS. 2 and 4, the projecting roller portions engage the panel 10 of the element 9. Thus, fore-and-aft horizontal thrust exerted relatively between and upon the elements 8 and 9 is carried by the rollers 22 and shafts 23. This prevents undesirable friction between the guide rods 18 and their associated guideways.

Briefly recapitulating the operation, road shocks imposed upon the truck T and transmitted from the truck to the automobile A result in relative vertical movements between the truck and the automobile which may be amplified by the resilience of the tires on the two vehicles. The construction of the snubber S provides for cushioned vertical movements between the elements 8 and 9 and enables the automobile rubber bumper parts 6 to move up-and-down substantially in unison with the movably mounted element 9 of the snubber so that there will be no damaging rubbing of the bumper parts 6 on any part of the snubber, or in fact on any part of the truck T itself.

The construction shown in the drawings and described is the presently preferred embodiment of the invention, but the disclosure is intended to be illustrative rather than definitive, the invention being defined in the claims.

I claim:

1. For combination with a transporting vehicle having a relatively horizontal carrying surface and a relatively vertical surface extending upwardly from said carrying surface and generally transversely to the line of travel of said transporting vehicle, and a transported vehicle supported on said transporting vehicle relatively horizontal surface and having an end member, the transporting vehicle being subject to vertical shocks during ground travel which are transmitted to the transported vehicle with consequent relative vertical movements between said vehicles occurring: a snubber for interpositioning between said transporting vehicle relatively vertical surface and said transported vehicle end member, said snubber comprising a first element for securing to said transporting vehicle relatively vertical surface; a second element mounted on said first element for vertical both up-and-down movements relative thereto and having a vertical surface engageable by the end member of a transported vehicle supported on said relatively horizontal surface of said transporting vehicle for establishing the relative positions of said vehicles in the direction of travel of said transporting vehicle; and means for cushioning the up-and-down movements of said second element relative to said first element, whereby said second element and said transported vehicle end member in engagement therewith will move up and down substantially in unison without undue vertical rubbing of said transported vehicle end member on said second element.

2. Snubber according to claim 1 in which means mounting said second element on said first element comprises a vertically extending guide means on one of said elements and guideway means on the other of said elements engaging said guide means.

3. Snubber according to claim 2 including a plurality of rollers journalled on one of said elements to rotate on horizontal axes and being engaged by the other of said elements to facilitate said up-and-down movement of said second element relative to said first element.

4. Snubber according to claim 1 in which said means for cushioning the up-and-down movements of said second element relative to said first element comprises spring means interposed between said elements and being loaded to urge said second element to a position between up and down positions thereof.

5. Snubber according to claim 2 in which said vertically extending guide means comprises rod means mounted on one of said elements, and said guideway means is provided by aperture means in the other of said elements through which aperture means said rod means extends.

6. Snubber according to claim 5 in which said means for cushioning the up-and-down movements of said second element comprises coil springs surrounding said rod means, said springs engaging both of said elements, and acting upon said second element in opposite vertical directions.

7. Snubber according to claim 1 in which said first element comprises a vertical wall which faces towards a transported vehicle on said relatively horizontal surface of said transporting vehicle and spaced upper and lower end walls, said second element comrpises a vertical wall parallel and adjacent to said relatively vertical wall of said first element and upper and lower end walls respectively overlapping the upper and lower end walls of said first element and being vertically spaced therefrom, said second element vertical wall being the part of said snubber engageable by said transported vehicle end member, said second element being mounted on said first element by vertically extending guide means mounted on the end walls of one of said elements, and guideway means in the end walls of the other of said elements engaging said guide means.

8. Snubber according to claim 7 in which said means for cushioning the up-and-down movements of said second element comprises springs interposed between the overlapping upper end walls of said first and second elements and between the overlapping lower end walls of said first and second elements, said springs acting upon said second element in opposite vertical directions.

9. Snubber according to claim 8 in which said guide means comprises two vertically extending, horizontally spaced rods mounted on the end walls of said one of said elements and said guideway means is provided by apertures in the end walls of said other of said elements.

10. Snubber according to claim 9 in which said springs are coil springs surrounding said rods at opposite ends thereof, there being two such springs between and engaging the overlapping upper end walls of said first and second elements and two such springs between and engaging the overlapping lower end walls thereof.

11. In combination, a transporting vehicle having a relatively horizontal carrying surface and a relatively vertical surface extending upwardly from said carrying surface and generally transversely to the line of travel of said transporting vehicle; a transported vehicle supported on said transporting vehicle relatively horizontal surface and having an end member, the transporting vehicle being subject to vertical shocks during ground travel which are transmitted to the transported vehicle with consequent relative vertical movements between said vehicles occurring: and a snubber interposed between said transporting vehicle relatively vertical surface and said transported vehicle end member, said snubber comprising:
 a. a first element secured to said transporting vehicle relatively vertical surface;
 b. a second element mounted on said first element for vertical both up-and-down movements relative to said first element and having a vertical surface engaged by said transported vehicle end member for establishing the relative positions of said vehicles in the direction of travel of said transporting vehicle; and
 c. means cushioning the up-and-down movements of said second element relative to said first element, whereby said second element and said transported vehicle end member in engagement therewith all move up-and-down substantially in unison without undue vertical rubbing of said transported vehicle end member on said second element.

12. Combination according to claim 11 in which means mounting said second element on said first element comprises a vertically extending guide means on one of said elements and guideway means on the other of said elements engaging said guide means.

13. Combination according to claim 12 including a plurality of rollers journalled on one of said elements to rotate on horizontal axes and being engaged by the other of said elements to facilitate said up-and-down movement of said second element relative to said first element.

14. Combination according to claim 11 in which said means for cushioning the up-and-down movements of said second element relative to said first element comprises spring means interposed between said elements and being loaded to urge said second element to a position between up and down positions thereof.

15. Combination according to claim 12 in which said vertically extending guide means comprises rod means mounted on one of said elements, and said guideway means in provided by aperture means in the other of said elements through which aperture means said rod means extends.

16. Combination according to claim 15 in which said means for cushioning the up-and-down movements of said second element comprises coil springs surrounding said rod means, said springs engaging both of said elements, and acting upon said second element in opposite vertical directions.

17. Combination according to claim 11 in which said first element comprises a vertical wall which faces towards said transported vehicle on said relatively horizontal surface of said transporting vehicle and spaced upper and lower end walls, said second element comprises a vertical wall parallel and adjacent to said relatively vertical wall of said first element and upper and lower end walls respectively overlapping the upper and lower end walls of said first element and being vertically spaced therefrom, said second element vertical wall being the part of said snubber engaged by said transported vehicle end member, said second element being mounted on said first element by vertically extending guide means mounted on the end walls of one of said elements, and guideway means in the end walls of the other of said elements engaging said guide means.

18. Combination according to claim 17 in which said means for cushioning the up-and-down movements of said second element comprises springs interposed between the overlapping upper end walls of said first and second elements and between the overlapping lower end walls of said first and second elements, said springs acting upon said second element in opposite vertical directions.

19. Combination according to claim 18 in which said guide means comprises two vertically extending, horizontally spaced rods mounted on the end walls of said one of said elements and said guideway means is provided by apertures in the end walls of said other of said elements.

20. Combination according to claim 19 in which said springs are coil springs surrounding said rods at opposite ends thereof, there being two such springs between and engaging the overlapping upper end walls of said first and second elements and two such springs between and engaging the overlapping lower end walls thereof.

21. Combination according to claim 11 in which said first element comprises a vertical panel having openings therein, two vertical side walls, spaced upper and lower end walls, and rollers mounted between said side walls to rotate about horizontal axes and having portions projecting partially through said openings, further in which said second element comprises a part providing said vertical surface of said second element, and upper and lower end walls respectively overlapping and being vertically spaced from the upper and lower end walls of said first element, further in which the mounting of said second element on said first element is provided by guide rods attached to and extending between the upper and lower end walls of one of said elements and guideway apertures in the upper and lower end walls of the other of said elements through which guideway apertures said guide rods extend to position said second element with said part thereof in engagement with said rollers, still further in which said means cushioning the up-and-down movements of said second element comprise coil springs surrounding said guide rods and being respectively interposed between and engaging said overlapping end walls of said first and second elements, said part providing said vertical surface of said second element engaging the projecting portions of said rollers whereby to facilitate up-and-down movements of said second element relative to said first element.

22. Combination according to claim 21 in which said first element further includes two flanges extending from said side walls thereof and being secured to said relatively vertical surface of said transporting vehicle.

23. Combination according to claim 21 in which said first element is formed of a plate blank bent to provide said panel, said side walls, said end walls and said flanges of said first element, and in which said second element is formed of a plate blank bent to form said part and said end walls of said second element.

24. In a snubber, the combination of a first element comprising a panel having openings therein, two side walls, spaced end walls, and rollers mounted between said side walls and having portions projecting partially through said openings; a second element comprising a roller engageable part and spaced end walls; guide rods attached to and extending between the end walls of one of said elements; guideway apertures in the end walls of the other of said elements through which said guide rods extend to mount said second element on said first element for sliding movements relative thereto with the end walls of said second element respectively overlapping the end walls of said first element and respectively being spaced therefrom, said guide rods and said guideway apertures positioning said second element relatively to said first element to provide engagement between said roller engageable part of said second element with said projecting roller portions; and coil springs surrounding said guide rods and being respectively interposed between and engaging the overlapping end walls of said first and second elements.

* * * * *